United States Patent
Fu et al.

(10) Patent No.: US 8,495,174 B2
(45) Date of Patent: Jul. 23, 2013

(54) METHOD AND APPARATUS FOR RESOURCE TRANSFER

(75) Inventors: Rong Yao Fu, Beijing (CN); Chang Jie Guo, Beijing (CN); Yi Hui, Beijing (CN); Wei Sun, Beijing (CN); Zhang Kuo, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 173 days.

(21) Appl. No.: 12/431,854

(22) Filed: Apr. 29, 2009

(65) Prior Publication Data

US 2009/0271500 A1    Oct. 29, 2009

(30) Foreign Application Priority Data

Apr. 29, 2008    (CN) .......................... 2008 1 0083948

(51) Int. Cl.
*G06F 15/16*    (2006.01)

(52) U.S. Cl.
USPC ........... 709/219; 709/223; 709/224; 709/225; 709/226; 709/231; 370/335; 370/229; 370/468

(58) Field of Classification Search
USPC .......... 709/219, 223–226, 331, 231; 370/335, 370/229, 468
See application file for complete search history.

(56) References Cited

U.S. PATENT DOCUMENTS

| | | | |
|---|---|---|---|
| 2003/0033448 A1* | 2/2003 | Kieffer | 709/331 |
| 2005/0083840 A1 | 4/2005 | Wilson | |
| 2006/0143601 A1* | 6/2006 | Concha et al. | 717/170 |
| 2007/0156903 A1* | 7/2007 | Ardulov | 709/226 |
| 2007/0233866 A1* | 10/2007 | Appleby et al. | 709/226 |

OTHER PUBLICATIONS

Brad Neuberg, "Tutorial: How to Profile and Optimize Ajax Applications", Aug. 15, 2006, http://codinginparadise.org/weblog/2006_08_15_archive.html.
How to OOP helps to resolve and optimize JavaScript class dependencies, Apr. 19, 2007, www.dotnetkicks.com/ajax/How_to_OOP_helps_to_resolve_and_optimize_JavaScript_class_depend.
"Profiling JavaScript applications with Venkman", Nov. 11, 2006, http://blog.thinkature.com/index.php/2006/11/11/profiling-javascript-applications-with-venkman/.

* cited by examiner

*Primary Examiner* — Wing F Chan
*Assistant Examiner* — Benjamin M Thieu
(74) *Attorney, Agent, or Firm* — Eustus D. Nelson

(57) ABSTRACT

A method and apparatus for transferring resources from a server to a client, wherein the resources are for an object in an application. According to the present invention, resources needed by the object are determined. Resources which have usages that are less than a threshold according to statistics are removed from the determined resources. The remainder of the determined resources, which are needed by the object, is transferred to the client. According to the present invention, users do not have to wait for a long time before they can see a web page.

14 Claims, 4 Drawing Sheets

METHOD AND APPARATUS FOR RESOURCE TRANSFER

CROSS-REFERENCE TO RELATED APPLICATION

This application claims priority under 35 U.S.C. §119 from Chinese Patent Application No. 200810083948.2 filed on Apr. 29, 2008, the entire contents of which are incorporated by reference herein.

BACKGROUND OF THE INVENTION

1. Field of the Invention

The present invention relates to the field of data processing. More particularly, the present invention relates to a method and apparatus for resource transfer.

2. Description of the Related Art

With the population of AJAX to modern web applications, script (e.g. JavaScript™ code) is becoming increasingly more important and has been an indispensable part thereof. However, the following problems can occur during its use.

For example, it will take a relatively long time to transfer the whole JavaScript™ code file from the server side to the client side. Further, it is also a time consuming task to initialize the whole JavaScript™ code file into a machine-executable DOM (Document Object Model) tree, especially when the JavaScript™ code file is relatively large.

Specifically, reference is made to FIG. 1, where resource dependency is schematically shown. In response to a request by a client, server S transfers a file of HTML code 11 to the client. The client displays to the user web page 12. The web page 12 may include various functionalities. These functionalities are implemented by calling various resources, the resources having code or code blocks that perform specific tasks.

Generally, resources may be functions, methods, procedures or subroutines. Resources may be written either in a compiled language such as JAVA™ or C++, or they may be written in an interpreted scripting language such as JavaScript™ or VBScript. Here, the invention is directed primarily to code written in these scripting languages, which are supported by most web browsers at present. Code or code blocks for the resources may be embedded in the HTML code or the HTML code may contain tags that refer 13 to an import file of code 14. As indicated in FIG. 1, the import file of code 14 may be a file of JavaScript™ code.

The web page shown in FIG. 1 is a registration page in which a user enters information, such as, name, address, and e-mail address in text fields. The HTML contains code 15a for a text area. Upon processing the code, the client or the web browser displays corresponding text area 15b, according to the specification of the HTML code 15a. As in this example, the text area 15b is an address field and the code 15a calls a function ValidateAddress( ) 16 to validate data entered into the address field by the user. The function ValidateAddress( ) is found in the JavaScript™ import file FORM.JS referenced by the file of HTML code 11. The ValidateAddress( ) function 16 further calls a method, parse( ) 17, found in another JavaScript™ import file, STRING.JS, to validate data entered into the address field by the user.

In other words, the web page 12 only needs the ValidateAddress( ) function 16 in the JavaScript™ import file FORM.JS and the method parse( ) 17 in the JavaScript™ import file STRING.JS. It does not need other functions in the JavaScript™ import file FORM.JS or other methods in the JavaScript™ import file STRING.JS. However, in the present schemes, other functions in the JavaScript™ import file FORM.JS and other methods in the JavaScript™ import file STRING.JS are also transferred to the client, so that the client has to wait for a relatively long time to receive corresponding files from the server.

Additionally, some JavaScript™ functions, although needed by the web page, are seldom used or not used at all by the web page. However, these JavaScript™ functions are all sent to the client irrespective of their usages. As a result, a user has to wait for a relatively long time before he/she can see the web page.

Accordingly, there is a need for a scheme to overcome the problems outlined above.

SUMMARY OF THE INVENTION

According to a first aspect of the present invention, there is provided a method for transferring resources from a server to a client, wherein the resources are for an object in an application. The method includes the steps of: determining resources needed by the object, removing resources, whose usages are less than a threshold according to statistics, from the determined resources which are needed by the object, and transferring the remainder of the determined resources, which are needed by the object, to the client.

According to a second aspect of the present invention, there is provided an apparatus for transferring resources from a server to a client, wherein the resources are for an object in an application, the apparatus including: determining means for determining resources needed by the object, removing means for removing resources, whose usages are less than a threshold according to statistics, from the determined resources, which are needed by the object, and transferring means for transferring the remainder of the determined resources, which are needed by the object, to the client.

According to the present invention, users do not have to wait for a long time before they can see a web page.

Other aspects of the present invention will become more apparent and easy to understand from the following description, taken in conjunction with the accompanying drawings.

BRIEF DESCRIPTION ON THE DRAWINGS

FIG. 1 schematically shows resource dependency.

DETAILED DESCRIPTION OF THE PREFERRED EMBODIMENTS

According to an embodiment of the present invention, resources needed by the web page are determined before a web page of a web application is sent to the client. The resources include functions, methods, procedures or subroutines written in an interpreted scripting language such as JavaScript™ or VBScript. The resources needed by the web page can be determined when the web application is deployed on the server. Then, resources whose usages are less than a threshold, according to statistics, are removed from the determined resources, which are needed by the web page. The usages may be either previous usages of resources by the client to which the web page will be sent or previous usages of resources by other clients different than the client to which the web page will be sent. Finally, the remainder of the determined resources, which are needed by the web page, is transferred to the client.

Figure 1:
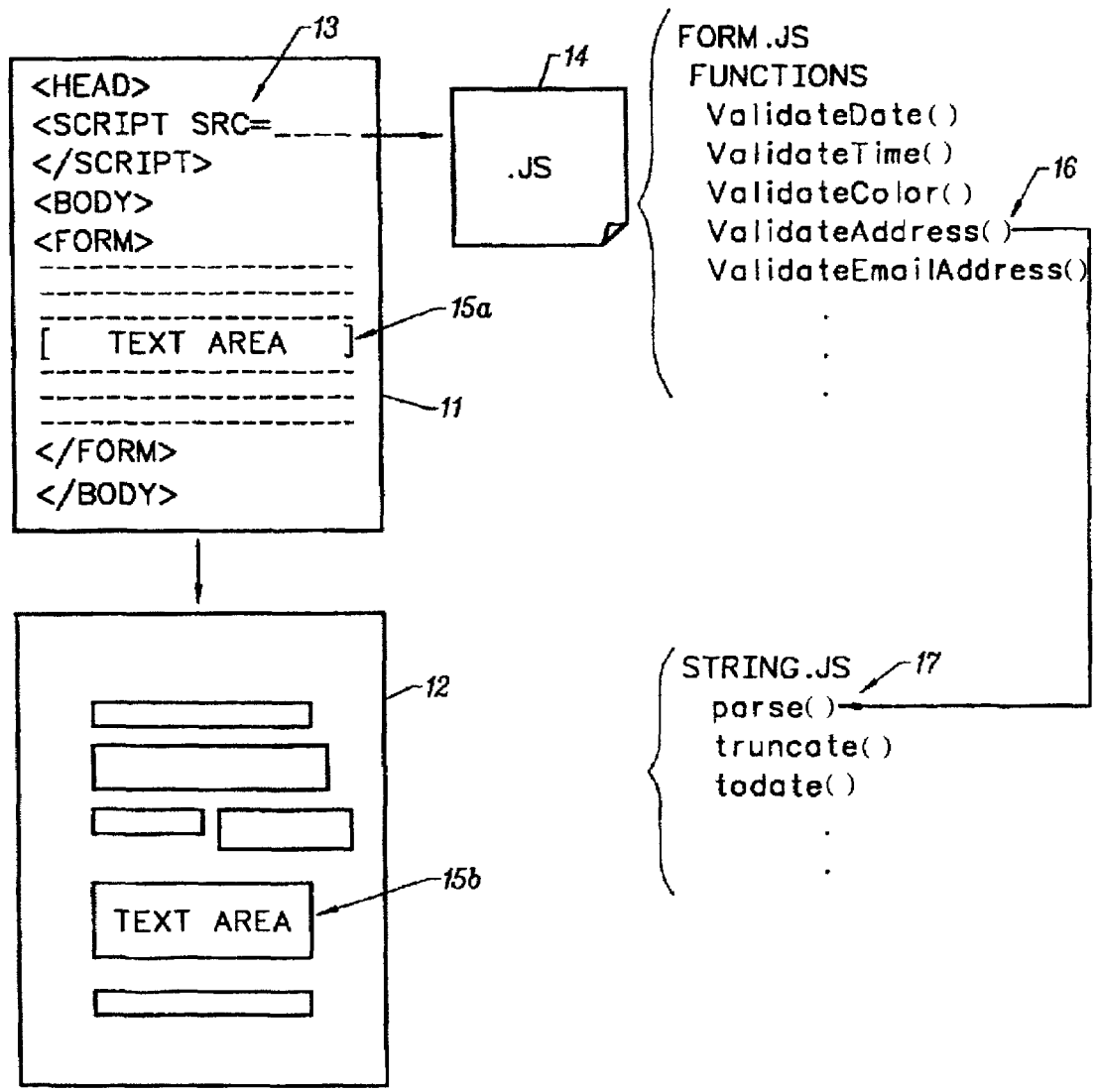
Figure 2:
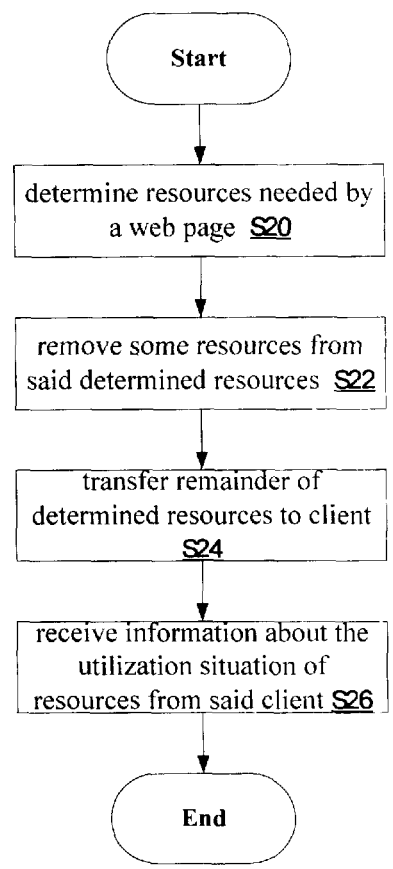
FIG. 2 shows a flowchart of a method for resource transfer according to an embodiment of the present invention.

FIG. 2 shows a flowchart of a method for resource transfer according to an embodiment of the present invention. First, resources needed by a web page are determined in step S20.

Figure 3:
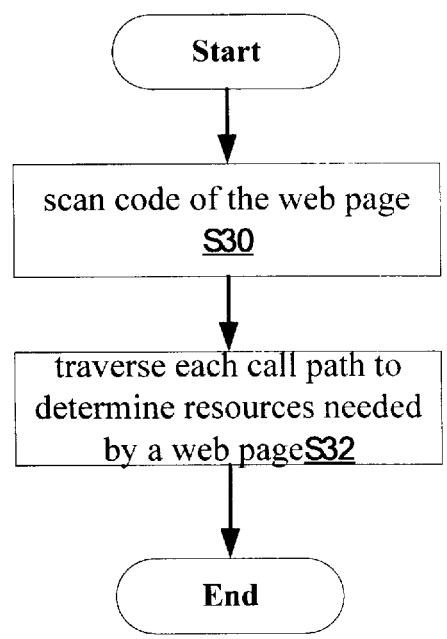
FIG. 3 shows a flowchart of a method of determining resources needed by a web page according to an embodiment of the present invention.

FIG. 3 shows a flowchart of a method of determining the resources needed by a web page according to an embodiment of the present invention.

Code of the web page is scanned in step S30. The code of the web page is scanned using a code parse tool.

In the present invention, various code parse tools can be employed, such as the Rhino JavaScript™ engine provided by AOL.

Scanning the code includes identifying entry points in the code.

These entry points include initial resource calls in the HTML code.

The entry points may include:
HTML tags that incorporate the JavaScript™ statement;
Actions associated with various web page elements (e.g. form); and
DOM (document object model) events.

Resource calls may be for functions, methods, procedures or subroutines, or any code or code blocks that perform specific tasks.

Although the embodiments of the present invention have been described in conjunction with JavaScript™, those skilled in the art will recognize that this is merely illustrative. The interpreted scripting language may also be VBScript.

Then, in step S32, each call path is traversed to determine resources needed by a web page.

Starting from the entry points identified in step S30, each call path is traversed to determine resources needed by a web page.

The traversing of each call path does not end until the following is encountered:
a resource that does not call any resources; or
a resource that calls a system function.

A resource dependency tree may be formed through step S32.

Next, in step S22, resources having usages that are less than a threshold, according to statistics, are removed from the determined resources which are needed by a web page. For example, if a resource's usage is less than 10%, this resource may not be sent to the client in order to reduce the network's burden and shorten the time for which the client has to wait.

Those skilled in the art will recognize that the threshold is not necessarily 10% and may be 5% or 15%. The threshold had better be a value, which can vary dynamically. Where the bandwidth condition is relatively good, the threshold may be a smaller value, for example 5%, and where the bandwidth condition is relatively bad, the threshold may be a larger value, for example 15%.

Additionally, those skilled in the art will recognize that if a resource is not sent to the client because its usage is less than a threshold, then resources downstream this resource in the call path are also not sent to the client for the reason that call to resources downstream this resource depends on this resource.

Finally, the remainder of the determined resources, which are needed by a web page, is transferred to the client in step S24.

In this step, the remainder of resources is concatenated into a single file and this file is sent to the client.

A basic method for doing statistics of usage is as follows: for a given JavaScript™ function, the number of calls and the time of each call in a specific statistical period of time are first obtained to calculate a total access time length (represented by A). Then, a total access time length (represented by B) of all JavaScript™ functions in this statistical period of time are calculated. Finally, this function's usage is calculated as A/B. Those skilled in the art can employ any other method of doing statistics of usage to carry out the present invention.

The usages may be either previous usages of resources by the client to which the web page will be sent or previous usages of resources by other clients different than the client to which the web page will be sent.

In another embodiment of the present invention, a browser plug-in such as Firebug™ is installed in advance on a browser, for example a Firefox™ browser, to capture all calls of JavaScript™ functions and the time of each call.

In yet another embodiment of the present invention, step S24 further includes transferring code for profiling the utilization situation of resources to the client.

For example, a profiling function (reference can be made to the Implementation of JavaScript™ AOP (Aspect-Oriented Programming) in dojo) can be bounded to functions for a web page. The profiling function can record each call to JavaScript™ functions and the time of each call.

In an embodiment of the present invention, the method for resource transfer further includes step S26 of receiving information about the utilization situation of resources from the client.

A polling mechanism can be employed to receive information about the utilization situation of resources from the client, that is, to receive profiling data. For example, the client is polled once every 10 seconds.

Also, a web page jump event can be employed to trigger transferring information about the utilization situation of resources from the client.

Upon receipt of the information about the utilization situation of resources, the server can analyze resource usages and, for example, calculate the usage of each function.

Figure 4:
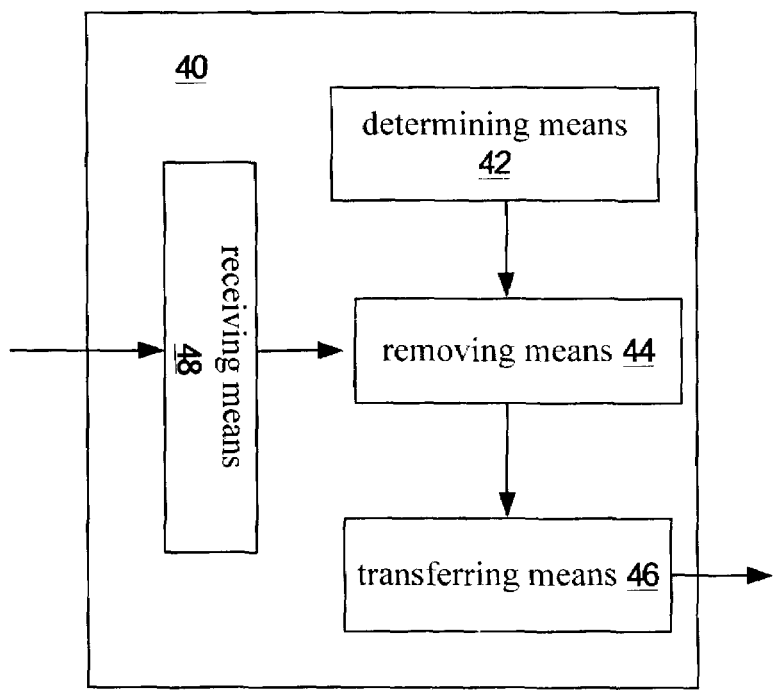
FIG. 4 shows a block diagram of an apparatus for resource transfer according to an embodiment of the present invention.

FIG. 4 shows a block diagram of an apparatus 40 for resource transfer according to an embodiment of the present invention.

As shown in FIG. 4, the apparatus 40 includes: determining means 42 for determining resources needed by a web page; removing means 44 for removing resources, whose usages are less than a threshold, according to statistics, from the resources, which are needed by the web page; and transferring means 46 for transferring the remainder of the resources, which are needed by the web page, to a client.

In an embodiment of the present invention, the transferring means 46 is also used for transferring code for profiling the utilization situation of resources to the client.

In another embodiment of the present invention, the apparatus 40 further includes receiving means 48 for receiving information about the utilization situation of resources from the client.

The resources include one or more of the following: functions, methods, procedures, and subroutines.

The resources are code or code blocks written in an interpreted scripting language.

The interpreted scripting language is JavaScript™ or VBScript.

In yet another embodiment of the present invention, the usages are previous usages of resources by the client to which the web page will be sent.

In a further embodiment of the present invention, the usages are previous usages of resources by other clients different than the client to which the web page will be sent.

It should be noted that in order to facilitate easier understanding of the present invention, the foregoing description omits more detailed technical details that are well known to those skilled in the art. Such details can also be useful in the implementation of the present invention.

The specification of the present invention has been presented for purposes of illustration and description, and is not intended to be exhaustive or to limit the invention to the form disclosed. Many modifications and variations will be apparent to those of ordinary skill in the art.

What is claimed is:

1. A method for transferring resources from a server to a client, wherein said resources are for an object in an application, said method comprising steps of:
    determining resources needed by said object, said resources being resources having a type selected from the group consisting of methods, procedures, functions or subroutines;
    removing at least some resources from said determined resources to provide a remainder of said determined resources when said at least some resources have usages that are less than a threshold according to statistics of amount of time said at least some resources are used in one or more of previous usages by said client or previous usages by other clients different from said client, wherein said threshold can be a percentage less than 100; and
    transferring said object and said remainder of said determined resources from said server to said client without transferring said at least some resources to said client;
    wherein said application comprises a web application and said object comprises a web page such that said step of transferring said object transfers said web page from said server to said client; and
    wherein said server is configured to analyze usages of the determined resources and calculate the usage of each determined resource of the type being a function.

2. The method according to claim 1, wherein the step of transferring the remainder of said determined resources to said client further comprises the step of:
    transferring code for profiling a utilization situation of resources to said client.

3. The method according to claim 1, further comprising the step of:
    receiving information about the utilization situation of resources from said client in order to determine said usage threshold.

4. The method according to claim 1, wherein said resources are code or code blocks written in an interpreted scripting language.

5. The method according to claim 1, wherein the usages are the previous usages of resources by the client.

6. The method according to claim 1, wherein the usages are the previous usages of resources by the other clients different from the client.

7. An apparatus for transferring resources from a server to a client, wherein said resources are for an object in an application, said apparatus comprising:
    a server configured to determine resources needed by said object, said resources being resources having a type selected from the group consisting of subroutines, methods, functions or procedures, and
    said server also being configured to remove at least some resources from said determined resources to provide a remainder of said determined resources when said at least some resources have usages that are less than a threshold according to statistics of amount of time said at least some resources are used in one or more of previous usages by said client or in previous usages b other clients different from said client, wherein said threshold can be a percentage less than 100, and
    said server being configured to transfer said object and said remainder of said determined resources to said client without transferring said at least some resources to said client;
    wherein said application comprises a web application and said object comprises a web page such that said server is configured to transfer said web page to said client; and
    wherein said server is configured to analyze resource usages and calculate usage of each determined resource of the type being a function.

8. The apparatus according to claim 7, wherein said server is configured to transfer code to said client, said code usable to profile a utilization situation of resources to said client.

9. The apparatus according to claim 7, wherein
    said server is configured to receive information about the utilization situation of resources from said client.

10. The apparatus according to claim 7, wherein said determined resources include code or code blocks written in an interpreted scripting language.

11. The apparatus according to claim 7, wherein the usages are the previous usages of resources by the client.

12. The apparatus according to claim 7, wherein the usages are the previous usages of resources by the other clients different from the client.

13. The apparatus of according to claim 7, wherein said threshold usage is determined by a profiling function bounded to functions provided by said web application.

14. The apparatus according to claim 7, wherein said server is configured to receive information regarding utilization of resources from said client in response to a web page jump.

* * * * *